US008294790B2

(12) United States Patent
Godfrey et al.

(10) Patent No.: US 8,294,790 B2
(45) Date of Patent: Oct. 23, 2012

(54) BLAST RESISTANT VIDEO RECORDING DEVICE

(75) Inventors: Michael Godfrey, Toronto (CA); Christopher Knight, St. Catharines (CA)

(73) Assignee: Visual Defence, Inc, Richmond Hill (CA)

( * ) Notice: Subject to any disclaimer, the term of this patent is extended or adjusted under 35 U.S.C. 154(b) by 230 days.

(21) Appl. No.: 12/232,802

(22) Filed: Sep. 24, 2008

(65) Prior Publication Data

US 2010/0073493 A1    Mar. 25, 2010

(51) Int. Cl.
*H04N 7/18* (2006.01)
*H04N 9/47* (2006.01)
*H04N 5/225* (2006.01)
*G06F 1/16* (2006.01)
*H05K 5/00* (2006.01)
*H05K 7/00* (2006.01)

(52) U.S. Cl. ....... 348/231.7; 348/82; 348/151; 348/375; 361/679.34

(58) Field of Classification Search .............. 348/82–85, 348/151, 231.7–231.8, 373–376; 361/679.34–679.36; 396/427, 541; D16/203
See application file for complete search history.

(56) References Cited

U.S. PATENT DOCUMENTS

| 4,944,401 A * | 7/1990 | Groenewegen | 206/521 |
| 5,123,538 A * | 6/1992 | Groenewegen | 206/521 |
| 5,497,960 A * | 3/1996 | Previnaire | 244/17.11 |
| 5,859,765 A * | 1/1999 | Grewe | 361/724 |
| 6,715,939 B2 * | 4/2004 | Ford | 396/427 |
| 7,327,396 B2 * | 2/2008 | Schultz et al. | 348/375 |

OTHER PUBLICATIONS

PCT International Search Report & Written Opinion, PCT/CA2009/001204, Issued Jan. 7, 2010.

* cited by examiner

*Primary Examiner* — Daniel M Pasiewicz
(74) *Attorney, Agent, or Firm* — Grant Tisdall; Gowling Lafleur Henderson LLP

(57) ABSTRACT

A video recording device adapted to be resistive to thermal and mechanical shocks experienced in a catastrophic event, the device including a plurality of interchangeable components, the device comprising: a housing; a video component releasably mounted in the housing and having a lens for capturing images from an external environment of the device and a digital processor for producing digital data from the captured images; a memory component releasably mounted in the housing and releasably coupled to the video component adapted for storing the digital data received from the video component, the memory component including a non-volatile memory unit and an enclosure adapted for inhibiting the transfer of thermal and mechanical shocks from the external environment to the non-volatile memory unit, the non-volatile memory unit enclosed in the enclosure; and an interface component releasably mounted in the housing and releasably coupled to the video component and the memory component, the interface component adapted for providing power and data communication from the external environment to the video component and the memory component.

24 Claims, 11 Drawing Sheets

BLAST RESISTANT VIDEO RECORDING DEVICE

FIELD OF THE INVENTION

This invention relates to a video recording device.

BACKGROUND

Solid state memory devices have been used in data recorders for recording essential data or information useful in determining causes of crashes or other mishaps in aircraft and other vehicles. When a crash occurs, it is essential that the recorded information on board survive the crash and subsequent events including heat, cold, flame, debris impacts and fire that may afterwards ensue. Unfortunately, current methods for protecting data from catastrophic events in aircraft are not suitable for protecting digital video data stored in non-volatile memory devices. There is a need to provide a event proof memory module capable of storing a video recording that will survive blast and other catastrophic failures that may be caused by bomb blasts or other IED type devices. The retrieved video recording can be used to investigate and prosecute, if appropriate, the offenders that caused the catastrophic failure.

Shielding the memory unit of a vehicle digital data recorder system during a crash, for both mechanical and thermal shocks, presents extremely demanding design constraints. It is desirable to protect video digital data supplied to the memory unit recorded prior to the catastrophic event. In this regard, in order to preserve the digital data, the memory unit must be enclosed in a protective device configured and arranged to withstand excessive temperatures and to endure shocks and crushing and penetration forces experienced either on impact or during secondary impact with other portions or pieces of the vehicle.

Typical enclosures designed to meet these constraints are usually bulky, enclosures, which have large space, weight, and power requirements. These extreme requirements generally prohibit the use of most crash-survivable enclosures deployed simultaneously in a plurality of vehicles such as, general aviation aircraft, railroad passenger/cargo cars, buses, or cargo trucks, and other stationary sites.

A further disadvantage to current crash-survivable enclosures is that the identity of the stored data from a particular recording device is problematic when there are multiple devices in an immediate vicinity. A further disadvantage to current crash-survivable enclosures is that they are not configurable to the particular memory and imaging requirements for a specific class of catastrophic event without having to resort to a reconfiguration of the entire recording device.

SUMMARY

It is an object of the present invention to provide one or more components of a blast resistant video recording device to obviate or mitigate at least some of the above-presented disadvantages.

Current methods for protecting data from catastrophic events in aircraft are not suitable for protecting digital video data stored in non-volatile memory devices. Typical enclosures designed to meet these constraints are usually bulky, enclosures, which have large space, weight, and power requirements. These extreme requirements generally prohibit the use of most crash-survivable enclosures deployed simultaneously in a plurality of vehicles such as, general aviation aircraft, railroad passenger/cargo cars, buses, or cargo trucks, and other stationary sites. Contrary to current recording devices here is provided a video recording device adapted to be resistive to thermal and mechanical shocks experienced in a catastrophic event, the device including a plurality of interchangeable components, the device comprising: a housing; a video component releasably mounted in the housing and having a lens for capturing images from an external environment of the device and a digital processor for producing digital data from the captured images; a memory component releasably mounted in the housing and releasably coupled to the video component adapted for storing the digital data received from the video component, the memory component including a non-volatile memory unit and an enclosure adapted for inhibiting the transfer of thermal and mechanical shocks from the external environment to the non-volatile memory unit, the non-volatile memory unit enclosed in the enclosure; and an interface component releasably mounted in the housing and releasably coupled to the video component and the memory component, the interface component adapted for providing power and data communication from the external environment to the video component and the memory component.

One aspect provided is a video recording device adapted to be resistive to thermal and mechanical shocks experienced in a catastrophic event, the device including a plurality of interchangeable components, the device comprising: a housing; a video component releasably mounted in the housing and having a lens for capturing images from an external environment of the device and a digital processor for producing digital data from the captured images; a memory component releasably mounted in the housing and releasably coupled to the video component adapted for storing the digital data received from the video component, the memory component including a non-volatile memory unit and an enclosure adapted for inhibiting the transfer of thermal and mechanical shocks from the external environment to the non-volatile memory unit, the non-volatile memory unit enclosed in the enclosure; and an interface component releasably mounted in the housing and releasably coupled to the video component and the memory component, the interface component adapted for providing power and data communication from the external environment to the video component and the memory component.

BRIEF DESCRIPTION OF THE DRAWINGS

Exemplary embodiments of the invention will now be described in conjunction with the following drawings, by way of example only, in which.

DETAILED DESCRIPTION OF THE PREFERRED EMBODIMENT(S)

Video Recording Device 10

Figure 1:
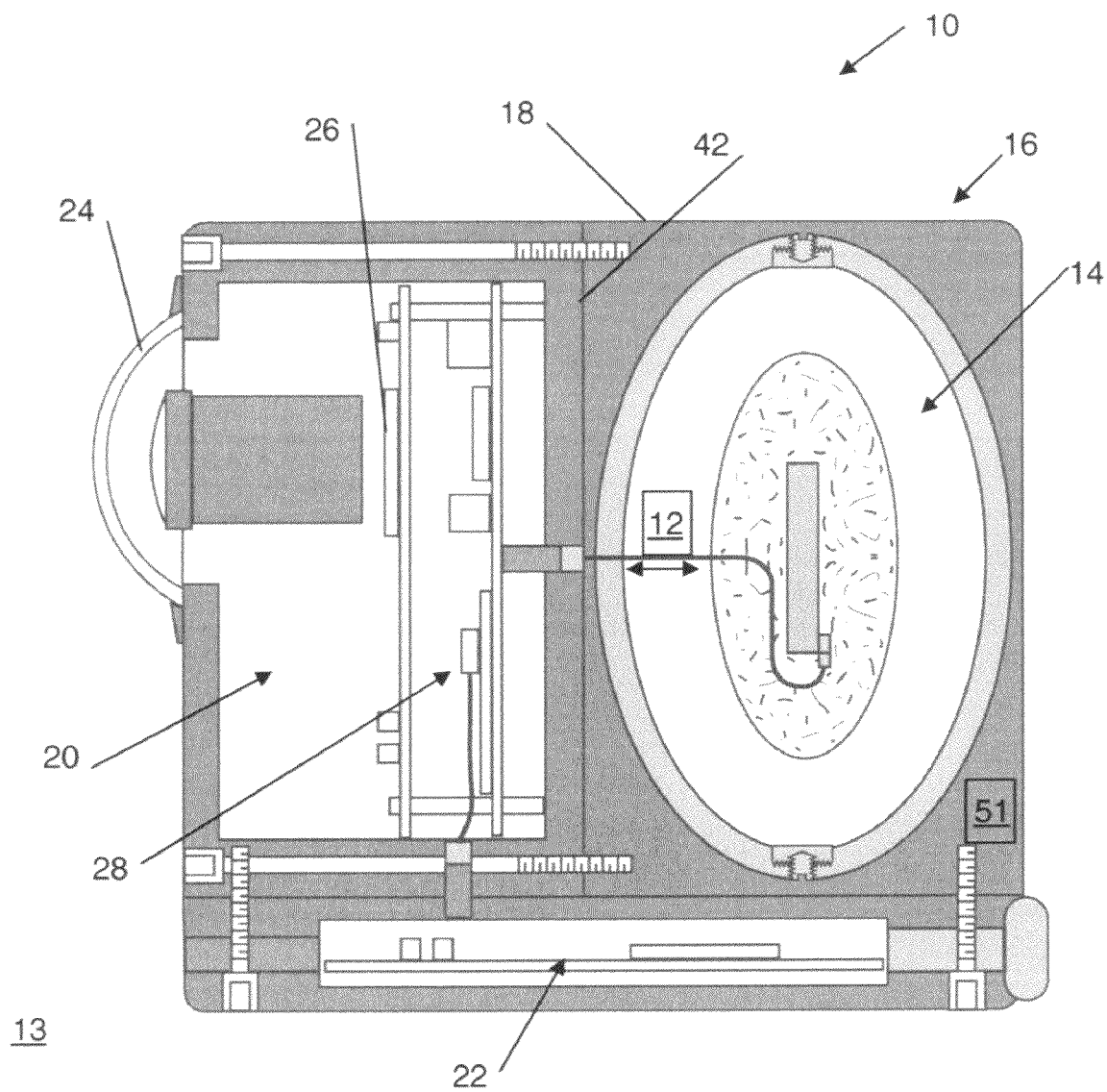
FIG. 1 is a component view of a video recording device.

Referring to FIG. 1, shown is a video recording device 10 designed so that the recorded digital video data 12 (optionally including stored digital audio data), hereafter referred to as the digital data 12, stored in a non-volatile memory 14 can potentially survive temperatures, pressures and/or physical shocks experienced due to a catastrophic event (e.g. blast and/or fire resulting from an incendiary device or crash) experienced from the surrounding environment 13 of the device 10. The device 10 can be configured as a self contained unit that captures images/audio data from the surrounding environment 13 and stores the digital data 12 to the memory 14, as programmed. The digital data 12 can be retrieved from the memory 14 and used to reconstruct recorded video/audio events after the catastrophic event has occurred. For example, the device 10 can be configured as a small and unobtrusive device that is applicable to mounting in the environment 13 such as public spaces, in/outside of vehicles (e.g. buses, automobiles, trains, planes, ships, etc.), as well as worn by individuals (e.g. soldiers or other field personnel). For example, the memory component 14 is configured to resist the vibration/physical shock and thermal shock conditions experienced by the device 10 during the catastrophic event.

One or more devices 10 are configured to be installed in association with an external device 15 that is mobile/immobile in the environment 13. It is recognised that there can be multiple devices 10 installed in the environment 13, as desired. For example, multiple devices 10 can be installed to cover each entrance and length of a vehicle. The devices 10 can also be positioned to show vehicle exteriors. As well, it is recognised that multiple devices 10 can be installed around building exteriors and interiors. Based on current public transportation fleet sizes and current video surveillance usage rates, approximately 200,000-300,000 device 10 could be used to provide a video surveillance capability to an average large scale mass transit system.

Referring again to FIG. 1, the device 10 has a plurality of interchangeable components 16 mounted in a housing 18, such that one or more of the components 16 can be interchanged depending on the specific use or environment of the device 10. The components 16 include components such as but not limited to: an electronic video (and optional audio) imaging and processing component 20 for producing the digital data 12; the blast resistant memory module component 14 for storing the digital data 12 received from the video component 20; and a power supply and communication interface component 22 for providing operation power for the video component 20 and the memory component 14 as well as providing external (to the device 10) communication between a user (e.g. diagnostic technician, event investigator, etc.) and the component(s) 14, 20. Accordingly, the device 10 can be assembled using selectively sized components 16 to provide for the desired power requirements, video quality requirements, and/or memory requirements of the device 10 when positioned in its particular environment 13.

Example Catastrophic Event Parameters

The following are example event parameters that the memory component 14 can configured to be resistant to.

Static Crush—The memory component 14 can be subjected to a static crush force of (2,000 lbf) applied continuously but not simultaneously to each of the three axes in the most critical direction, for a period of 5 minutes. Fire—At least 50% of the outside area of the memory component 14 can be subjected to flames of at least 1100° C. for a period of 15 minutes. Impact—The memory component 14 can be subjected to half sine wave impact shocks applied to each of the three axes in the most critical direction, and having a peak acceleration of up to 3400 'g' for 5 milliseconds. Penetration Resistance—The memory component 14 can be subjected to an impact force produced by a 500 lb steel bar which is dropped from a height of 10 ft on to the weakest face of the memory module in the most critical plane. The point of contact of the bar can have an area no greater than 0.1 in$^2$.

Video Component 20

Referring again to FIG. 1, the video component 20 includes a lens 24 for capturing still images and/or video (e.g. an image sequences) in its field of view of the surrounding environment 13 of the device 10, an image sensor 26 (e.g. CMOS or CCD image sensor configured to capture video images) for producing the video digital data 12 from the images/video captured by the lens 24, and an image processing and control interface 28 for facilitating the configuration and operation of the video component 20. For example, the electronic video imaging and processing interface 28 can be a fully digital device which implements industry standard video compression techniques/algorithms provided by a purposely built digital signal processor (DSP). The DSP can be combined with a general purpose CPU in order to control other features of the video component 20 such as but not limited to: time clock, diagnostics, streaming data interface and interface to the memory 14 as well as the access to the video data and export control interface 22.

Figure 2:
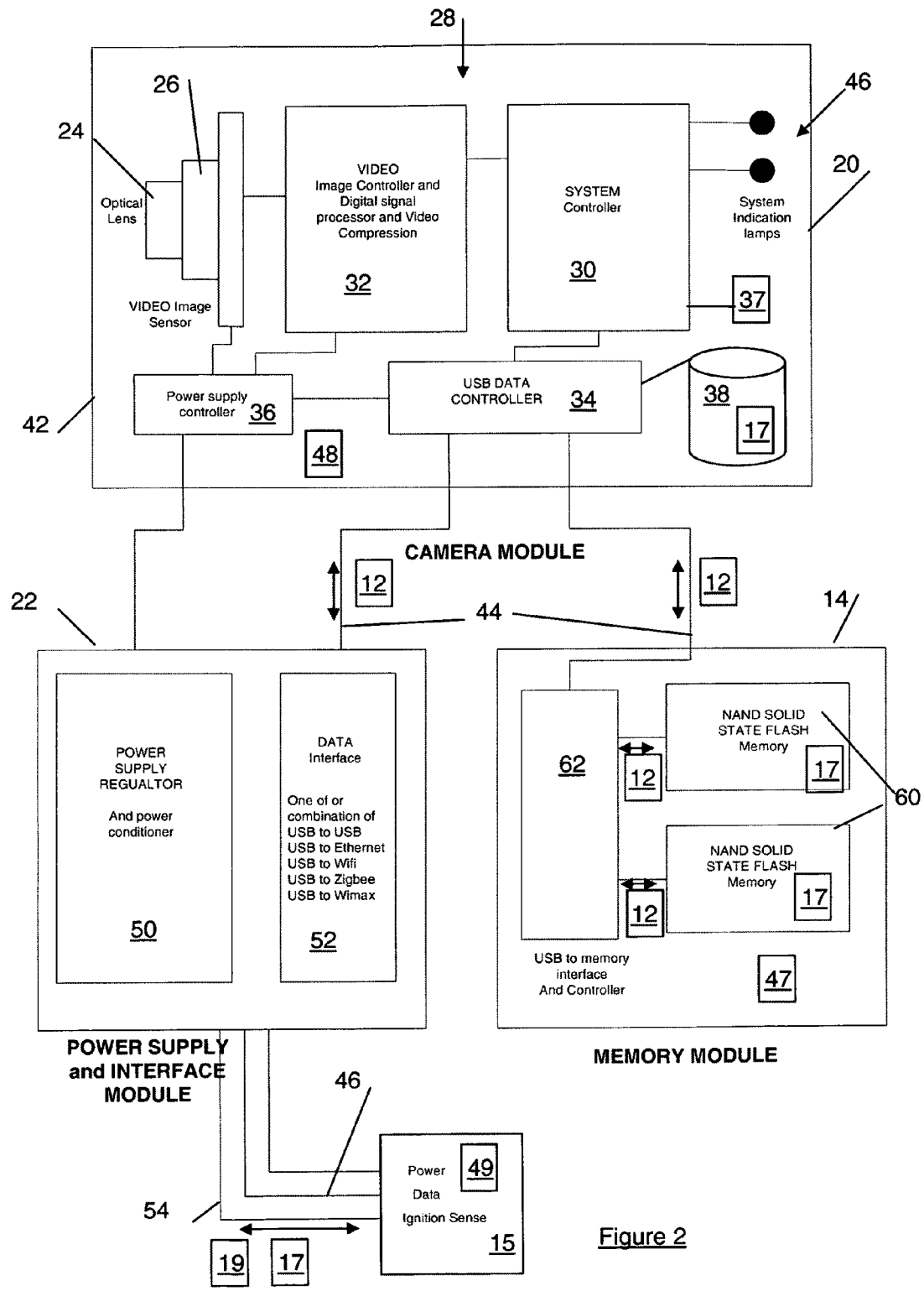
FIG. 2 is a further embodiment of the video recording device of FIG. 1.

Referring to FIG. 2, the video component 20 uses the DSP 32 of the video imaging and processing interface 28 to manipulate the digital data 12 (or a purposely built processor) that filters the digital data 12 and removes unwanted data if appropriate and then compresses the digital data 12 (e.g. using temporal compression) in order to reduce to total size of memory storage used by the digital data 12 in the memory component 14. A second computing processing unit (CPU) 30 is used to control other functions of the video module 20 such as but not limited to monitoring system operations and interfacing to external devices 15 and the memory storage 14. The video component 20 can also have additional devices such as a data controller (e.g. USB) 34 and a power supply controller 36 used to manage data interfaces and power regulation respectively. The video component 20 can also have an audio recording device 37 (e.g. microphone) for recording sound data (e.g. as part of the digital data 12). The video component 20 can also have a separate memory 38 (e.g. on-board memory) for temporarily storing of the captured digital data 12 and/or for storing configuration data 17 (further described below) for the operation (e.g. DSP configuration) of the video component 20. It is also recognised that the configuration data 17 can also be stored in the memory 14 for use by the video component 20.

Referring again to FIG. 2, the video component 20 can also have a separate case 42 for providing mechanical isolation, vibration and/or environmental protection for dust, temperature, water and other contaminants. The video component 20 has two connectors 44, one that connects to the memory module 14 and the other that connects to the power supply and external data interface module 22. The control CPU 30 can monitor the camera operation and display the state of the recorder camera on LED's 46 that enable maintenance staff or other device 10 users to view system operation visually. The control CPU 30 can also provide the ability to communicate with the external devices 15 through the power supply and external data interface module 22 to transmit the health state of the video recorder camera to remote monitoring locations. The power supply and external data interface module 22 also provides a communication link 46 in order to remotely update the CPU operating instructions (e.g. configuration data 17) in order to provide new/updated features and new/updated internal software code issues of the processors 30,32.

Configuration Data 17

The video component 20 can contain algorithms that allow the adjustment of recording parameters (e.g. configuration data 17) and to display additional data on the video image or data within a separate file associated with the video images, known as metadata. This metadata can contain additional information such as data used to identify installation location (e.g. external device 15 identification 49—see FIG. 2) and other specifics such as but not limited to, location, time and date. For example, the digital data 12 can also contain a unique identification (ID) 47 of the specific memory component 14 and/or a unique identification (ID) 48 of the specific video component 20. Also, the digital data 12 can be assigned a unique identification (ID) 51 of the device 10 itself, see FIG. 1. Accordingly, the digital data 12 can be identified as to the specific device 10 and/or components 16 of the device 10 used to record and store the digital data 12.

The video control algorithms of the controllers 30, 32 are stored internally in the video component 20 using non volatile memory units 60 (see FIG. 2) and/or the local memory 38 of the video component 20. The system memory 38,60 can accessed remotely via the connection 44 and the interface component 22 to change the camera features and firmware (e.g. configuration data 17). These parameters of the configuration data 17 can include but are not limited to the camera resolution, the frames per second to store, the ability to show on screen or stored data within the image such as camera identification information, time and date. The external software can includes the ability to view the camera image in order to assist in setting up the video component 20 and focusing the lens 24.

Example Video Component 20 Embodiment

The video component 20 is designed to operate within a large range of temperatures and vibration conditions when coupled to an external device 15, such as but not limited to personnel, busses, trains and aircraft. One example embodiment of the video component 20 is as a camera module that uses a solid state image sensor 26 with a minimum of 640× 480 pixels or larger. The image sensor 26 may be manufactured using CMOS or CCD technology. The sensor 26 may be of the type produced by Omnivision model OV7640. The video component 20 can be programmed (via the configuration data 17) to capture between 1 to 30 Frames Per Second. The resolution of camera is dependent on the sensor 26 selected but can be adjusted to use several resolutions up to the maximum of the image sensor 26. The exact resolution selection can be dependent on individual parameters (e.g. configuration data 17) but also on the total amount of memory storage available in the memory 14. For example, different resolution selections may require different sensors 26 for different resolution and FPS combinations which would result different video storage size requirements. The video component 20 can constantly record until all memory 14 is used after which the camera starts to over write the oldest images. The video images are compressed by the DSP processor 32 using compression algorithms, e.g. Motion pictures expert Group Version 4 MPEG4, ITU Video Coding Expert Group compression algorithms, etc. The algorithms can provide approximately 160 times compression of the digital data 12 for storage in the memory 14. The compression algorithms can be adjusted through the camera interface component 22 through an external computer 15 depending on several parameters of the configuration data 17 to provide desired higher or lower compression depending on the desired quality of the stored images of the digital data 12.

The control unit 30 also provides the ability to interface with an external computer (e.g. external device 15) in order to configure recording parameters of the configuration data 17. The control unit 30 can also provide the ability to view live images in order to provide indication to the installer of the device 10 in the setting up of the cameras as to the Field of view and focus. The control unit 30 can also receive the image data 12 that was digitally compressed using known industry standards such Mpeg4 Simple profile or ITU standard H.264 (also known as Mpeg4 part 10) and encapsulate the data 12 such that a media player can replay the data 12. Several different data encapsulation techniques may be used such as AVI or QuickTime. The data 12 can also be retrieved from the memory 14 and then stored on a memory of the external device 15 using the USB computer interface 22.

Power and External Interface Component 22

Referring again to FIG. 2, the component 22 is a power and communication module that is designed to provide several power options. The power source may be from vehicles, buildings, solar or self contained through a battery pack. The component 22 has a power supply regulator 50 for supplying operating power to the power supply controller 36 of the video component 20 and a data interface 52 for coordinating the communication of the digital data 12 and/or the configuration data 17 between the device 10 and external devices 15.

The power and communication component 22 also provides the interface connection 46 (see FIG. 2) to facilitate external devices 15 to communicate with the video component 20. The component 22 provides a power sense connection 54 that can be connected to the power source of the external device 15 (e.g. a vehicle such as a bus) to which the device 10 is mounted. For example, the connection 54 can act as an ignition sense such that when the external device 15 is started (e.g. the engine of the vehicle is started), the video component 20 will start producing/storing the digital data 12. The device 10 can also use the configuration data 17 to facilitate programming of a default turnoff setting such that the device 10 will continue to record images after a set period of time (e.g. 30 minutes) after the external device 15 is turned off (e.g. the vehicle engine is stopped). Alternatively, the connection 54 can be connected to a power supply (e.g. grid power, vehicle battery, other battery source) to provide for constant video/audio recording operation of the device 10 as long as power is available through the connection 54. The power supply regulator 50 can be compatible with a variety of different power sources, such as but not limited to 48V DC, 120 AC, and 12V DC power sources.

The interface component 22 can also be used to communicate diagnostic data 19 via the connection 46 that is representative of the operating condition of the video component 20 and/or the memory module 14. The diagnostic data 19 can include parameters such as but not limited to: unit ID 51; heartbeat signal indicating normal operation of the device 10 according to a predefined signal frequency (e.g. every 30 seconds); condition/status of the memory 14; condition/status of the video component 20; whether the lens 24 is occluded; the temperature of the device 10; and/or a time stamp.

It is also recognised that the interface component 22 can be used to change the configuration data 17 via the connection 46 remotely from the device 10 (e.g. wirelessly and/or wired through the connection 46).

Memory Component 14

The memory component 14 can be coupled to the other components 16 of the device 10 using internal mechanical mounts that may be manufactured from engineered plastics or moulded metal components, for example. As well, the shell 70 of the memory component 14 can be configured such that it can only be opened using special tools to retrieve the stored video images. From the memory units 60

Controller 62

Referring again to FIG. 2, the memory component 14 includes one or more solid state (i.e. non-volatile) memory units 60 and access to the memory units 60 is coordinated by a controller 62. The controller 62 acts as a memory module interface and can be embodied as an internal microprocessor that provides security access control to the memory units 60, to enable either read only or read write capability in order to prevent the digital data from being inadvertently overwritten or otherwise experience an unauthorized modification (e.g. deleted, modified, etc.). For example, the controller 62 can be configured so as only to allow writing, deleting, and/or modifying of the digital data 12 stored in the memory units 60 when the memory component 14 is coupled to the video component 20. For example, the controller 62 can be configured to only accept certain stored data 12 manipulation functions (e.g. writing, deleting, and/or modifying) when the controller 62 can confirm that the memory module 14 is connected via the connection 44 (see FIG. 2) to the appropriate video component 20, as identified by the unique video component ID 48 recognised by the controller 62 (i.e. the controller 62 is paired with a unique video component 20). Further, the controller 62 can also be configured to only allow reading of the stored digital data 12 when the memory component 14 is not connected to the video component 20 (e.g. the connection 44 between the components 14,20 is disabled. Further, as described above, the unique memory identification ID 47 can be coupled to all of the digital data 12 (e.g. as meta data) stored in the memory units 60 and/or can be inscribed on the case of the memory component 14, as desired, to help assist in the chain of evidence used in analysis of the digital data 12 after a catastrophic event is experienced by the device 10. It is recognised that the controller 62 may be positioned externally to the enclosure 70 of the memory component 14 and thereby be vulnerable to thermal and/or shock events experienced by the device 10. It is also recognised that the controller 62 may be positioned internally in the enclosure 70 of the memory component 14 and thereby be protected from thermal and/or shock events experienced by the device 10.

Memory Unit 60

Figure 3:
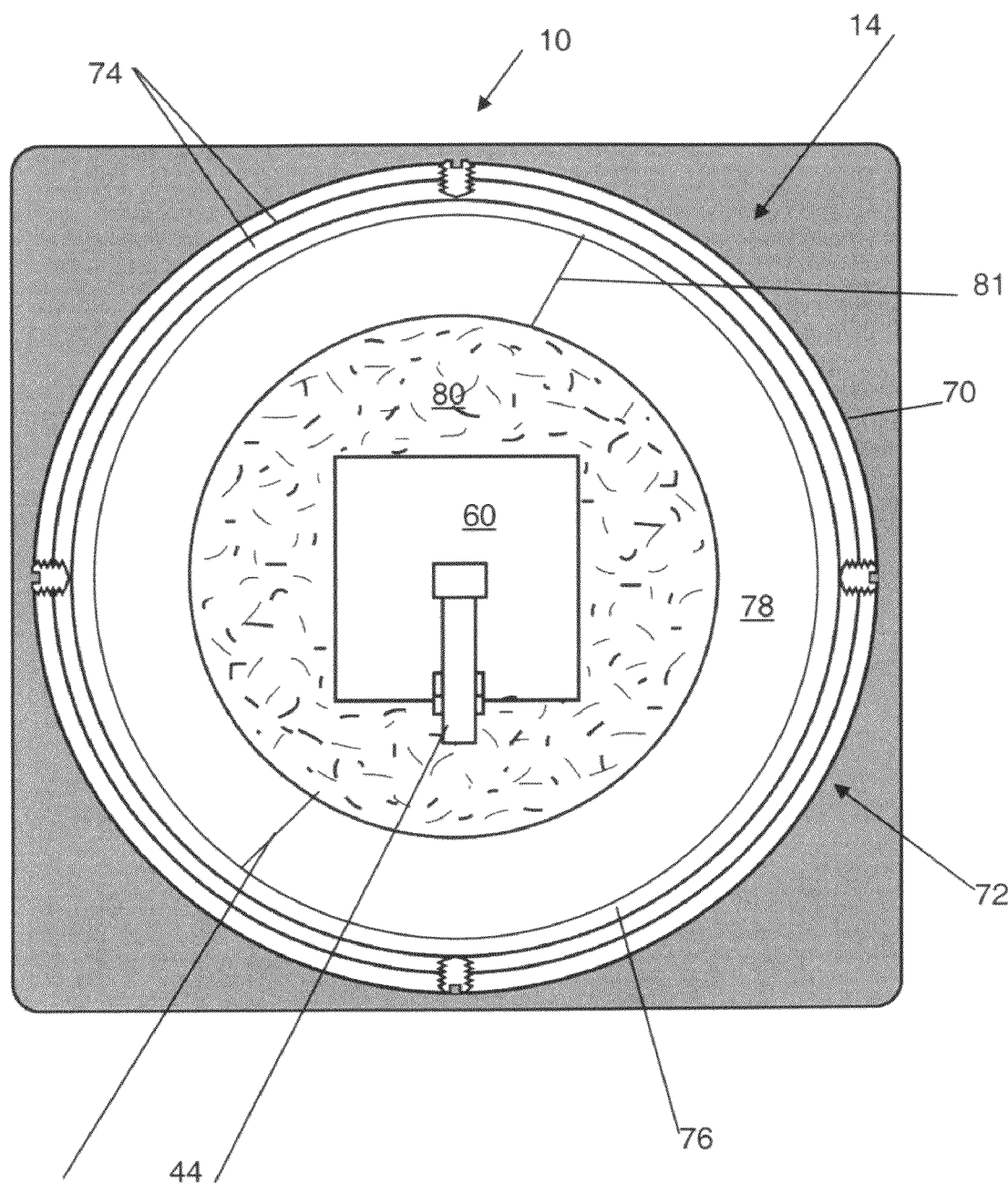
FIG. 3 is a top view of the memory component of FIG. 1.

Referring to FIG. 3, the memory module component 14 of the device 10 contains one or more of the solid state memory units 60 encased in an enclosure 70 designed to survive high mechanical shock and high temperatures over a predefined duration (e.g. approximately 15 minutes). The memory units 60 are coupled to the video component 20 via the controller 62 (see FIG. 2) and the digital data 12 received from the video component 20 by the controller 62 is stored on the memory units 60. Examples of the memory unit 60 is non volatile Flash memory such as NAND or MMIC type memory. The memory type can be selected so that the memory unit 60 does not require power to save the digital data 12 and the memory unit 60 has intrinsic mechanical shock characteristics.

For example, the memory unit 60 design can be selected for its low power requirements in order to reduce internal heating caused by internal power use. Mechanically the memory unit 60 is selected for desired low mass and high intrinsic shock characteristics in order to help reduce the amount of shock absorbing material required, as further described below. One example of the memory unit 60 is a NAND memory available from the semiconductor industry from companies such as Hynix, Samsung, Intel or Toshiba. Other examples are Micron part MT29F16G08DAAWPET or Samsung part #K9NCG08U5M. NAND memory is presently available in different storage sizes ranging from 1 GBytes to 16 GBytes with larger storage sizes becoming available according to standard industry roadmaps. It is intended to provide memory units 60 in various storage sizes according to specific user needs for the configuration of the components 16 (see FIG. 1) of the device 10. Regardless of the storage size implemented, all of the memory units 10 can use the same protective enclosure 70, as further described below. An example storage capacity of the memory unit 60 to supply 7 days of recording at a resolution of CIF and 7.5 frames per second is approximately 8 GBytes of storage.

Enclosure 70

Referring again to FIG. 3, the enclosure 70 of the memory component 14 is designed to help the memory units 60 survive both high temperatures and high mechanical shock that are produced by bomb blasts or other events of a catastrophic nature. The enclosure 70 is also designed for other mechanical criteria such as resistance to penetration and crush forces coming into contact with the device 10 from objects post incident, such as debris.

The enclosure 70 uses a plurality (e.g. three) layers 72 of protection to help the memory component 14 withstand the mechanical and temperature design considerations. The enclosure 70 has an exterior shell 74 designed to withstand debris/object impacts from the environment 13 (see FIG. 1). One example of the exterior shell 74 is hardened steel and/or a composite material of a predetermined thickness (e.g. 6 mm) with an optional inner layer 76 of a compressive insulator to inhibit the presence of voids (e.g. empty space) between exterior shell 74 and a layer of endothermic insulation 78. The exterior shell 74 can be composed of two halves 74a,b (see FIG. 4) that make an approximately spheroidal shaped enclosure 70 (e.g. roughly spherical, approximately round, roughly ball shaped). It is recognised that other shell 74 exterior geometrical shapes can be used, as desired, such as but not limited to spherical. It is recognised that the thermal layer 78 can be positioned in the enclosure 70 so as to provide thermal shock protection for the enclosed mechanical shock resistant layer 80 and the encapsulated memory unit(s) 60 and/or controller 62.

The outer shell 74 of the enclosure 70 can have an oval-like shape to facilitate its overall impact strength and help reduce its size and wall thickness. The material of the shell 74 can be formed using industry standard hot forging techniques. The shell 74 has two or more sections 74a,b to define a hollow interior in which to position the other layers 78,80 and the memory unit(s) 60 and controller 62. For example, the inside wall 74b of the shell 74 has a screw thread in order to facilitate assembly of the sections 74a,b, such that the shell sections 74a,b are screwed together and then locking pins 82 are installed to prevent the shell sections 74a,b from loosening. The two or more sections 74a,b can have one or more gaskets 87 situated between adjacent sections 74a,b for inhibiting the penetration of foreign matter (e.g. dirt, debris, fluid, etc.) into the interior of the enclosure 70.

The thermal insulation layer 78 can be made of a material that has endothermic properties (e.g. MIN-K as manufactured by Thermal Ceramics) that is designed to insulate the memory units 60 from a predefined magnitude/intensity of heat (e.g. insulation of temperatures up to 1100 C) applied externally to the enclosure 70 for a predefined time period (e.g. a short period of up to 15 minutes). The thermal insulation layer 78 can act as a thermal insulator. It can have specific thermal properties that both insulates and absorbs some of the heat applied to the exterior of the enclosure 70 due to the catastrophic event. For example, the layer 78 is configured to provide thermal protection for the memory units 60 for up to 15 minutes as this is the estimated time for the secondary fire to burn and subside or for emergency services to respond. Further, the material of the thermal insulation layer 78 is selected in order to reduce the size (i.e. external dimension(s)) of the overall memory enclosure 70. For example, the thermal insulation layer 78 has a thickness at its smallest dimension of 8-12 mm. The layer 78 can also be configured as a shell composed of two or more sections that are joined together (e.g. mechanically and/or chemically) to define a hollow interior for containing the layer 80 and the controller 62 and the memory unit 60.

Figure 4:
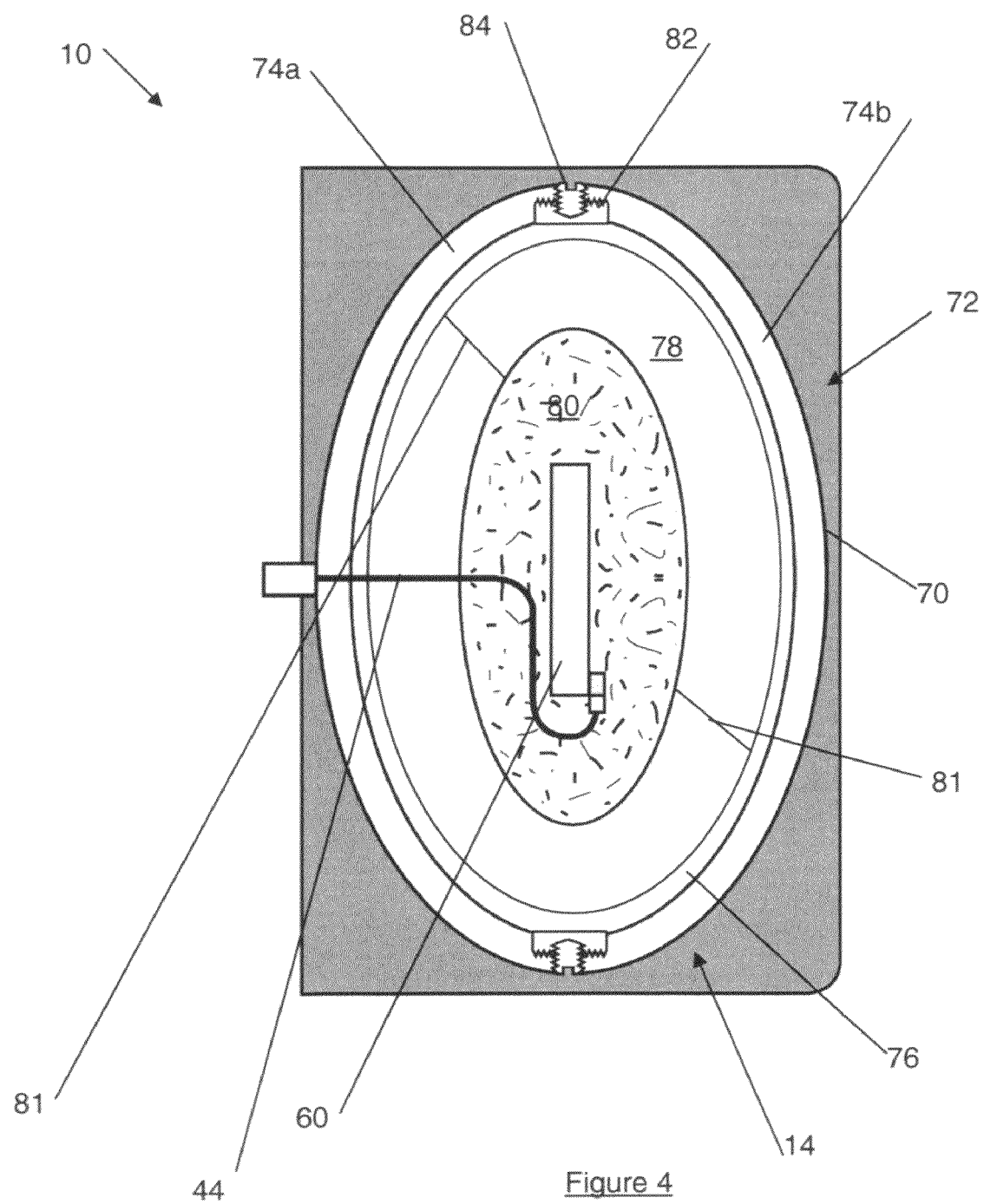
FIG. 4 shows side view of the memory component of FIG. 3.

Referring again to FIGS. 3 and 4, the enclosure 70 of the memory component 14 also includes layer 80, composed of a shock absorbing compound, that encapsulates the memory units 60, the controller 62 and a portion of the connection 44 between the video component 20 and the memory component 14. The layer 80 is used to mitigates high shock experienced by the memory component 14 caused by the catastrophic event. The shock absorber material of the layer 80 can be selected to reduce shocks of up to 3000 g's to about 1000 g's. For example, the shock absorber material can be is a rigid polyurethane foam known by the trade name of LAST-A-FOAM from General Plastics Manufacturing located in Tacoma Wash. Further, the material of the layer 80 can have a specific density selected to provide the appropriate shock absorption. As can be seen in FIGS. 3 and 4, the memory board (e.g. memory unit(s) 60 and controller 62) is placed within the layer 80 of Last-A-Foam or similar material that may be a formed material or a material that is poured around the memory board. The layer 80 can also be configured as a shell composed of two or more sections that are joined together (e.g. mechanically and/or chemically) to define a filled interior for containing the controller 62 and the memory unit 60. It is also recognised that the shock absorbing layer 80 can be comprised of two or more shock absorbing materials having different material properties (e.g. degree of brittleness, degree of shock absorption, etc.). The decision on where to position the different shock materials that make up the layer 80 can be dependent on any differences in wall 96 thickness and/or differences in shell 74 dimensions H,W.

Further, other features of the enclosure 70 can include such as but not limited to: the insulating layers 78,80 as well as the outer shell 74 are configured such that their respective seams 81 do not overlap; the exterior shape of the enclosure 70 can be an oval shape to facilitate overall strength and thickness reduction; and/or the outer face of the enclosure 70 is coated in a highly visible paint or other coating that can also provide some heat dissipation properties. It is also recognised that the layer adjacent to the shell 74 can be the shock resistant layer 80 and the layer adjacent to the shock resistant layer 80 and encapsulating the memory units 60 and/or the controller 62 is the thermally resistant layer 78, as desired. In the case where the thermal layer 78 is external to (e.g. on the outside of the shock layer 80), the material of the thermal layer 78 can be selected to have some mechanical/structural shock resistive properties, in order to remain integral during the catastrophic event so that the enclosed shock layer 80 is protected round its periphery by the thermal layer 78 from damaging heat shock.

Figure 5:
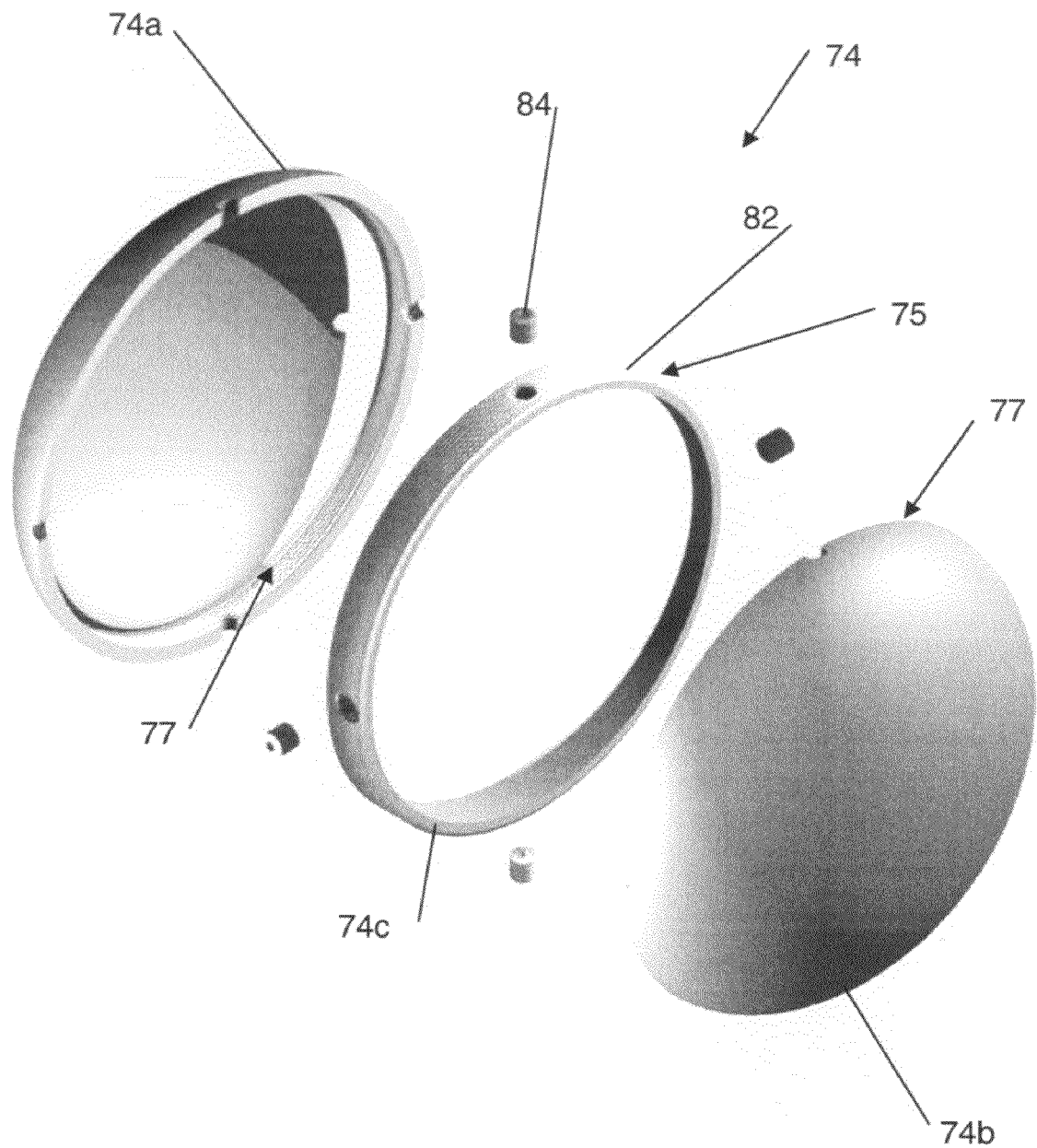
FIG. 5 is an alternative embodiment of a perspective exploded view of the shell of the enclosure of the device of FIG. 1.
Figure 6:
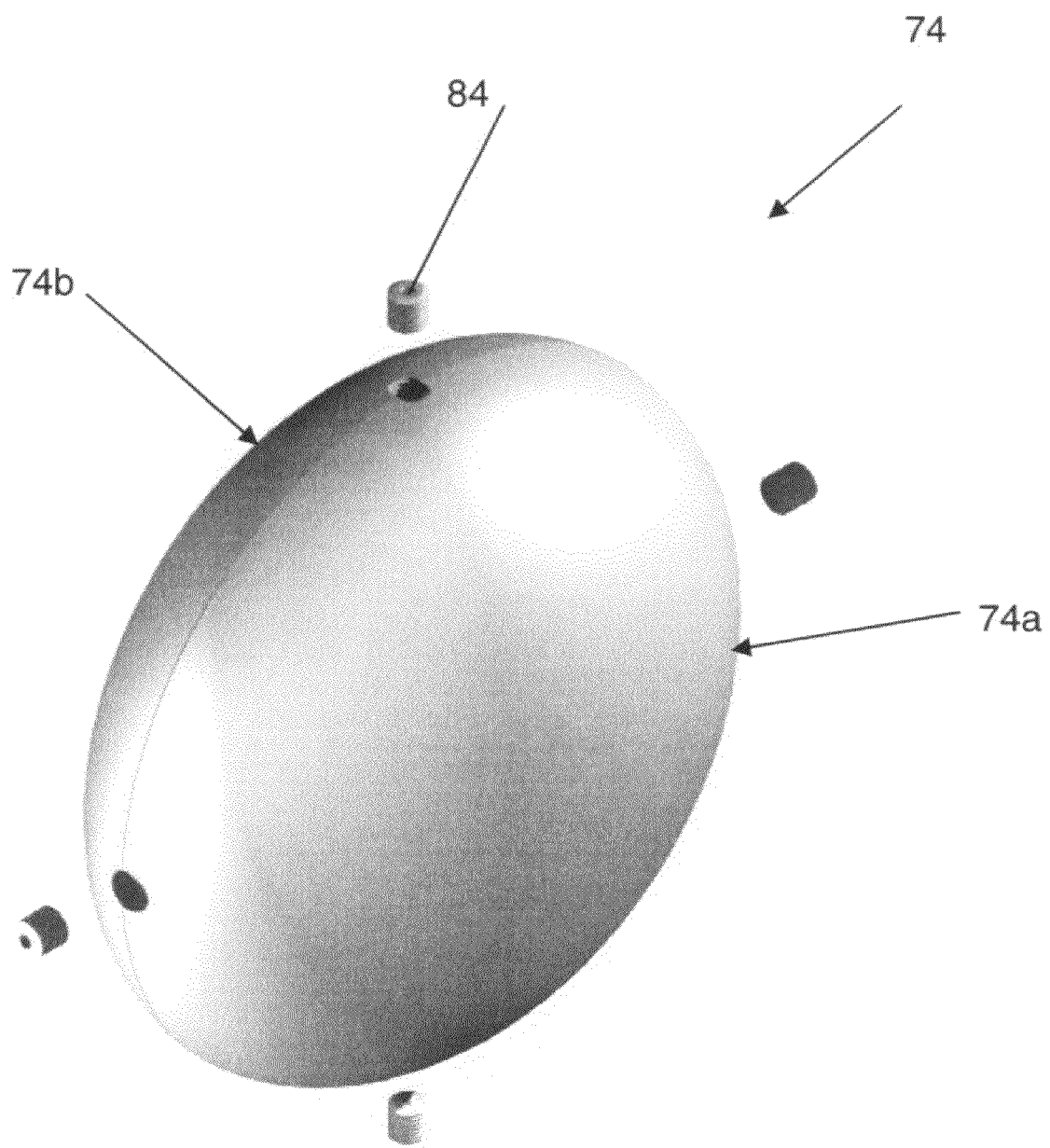
FIG. 6 shows is an assembled view of the shell of FIG. 5.

Referring to FIG. 5, shown is an exploded view of the shell 74 of the enclosure 70. The external shell 74 is composed of 3 steel parts that are screwed together, namely a first shell portion 74*a*, a second shell portion 74*b* and a threaded intermediate portion 74*c* (e.g. a ring) used to couple the two sections 74*a,b* to one another. For example, the intermediate portion 74*c* has external threads 75 that match internal threads 77 of the sections 74*a,b*. It is also recognised that the intermediate portion 74*c* can be external or internal to connect the sections 74*a,b* to one another. Referring to FIG. 6, shown is an assembled view of the shell 74.

In view of the above described assembly of the layers 74,78,80, it is recognised that the material of the inner layer 80 can be placed in compression by the walls of the adjacent layer 78, when assembled, and the material of the inner layer 78 can be placed in compression by the walls of the adjacent layer 74, when assembled.

Figure 7:
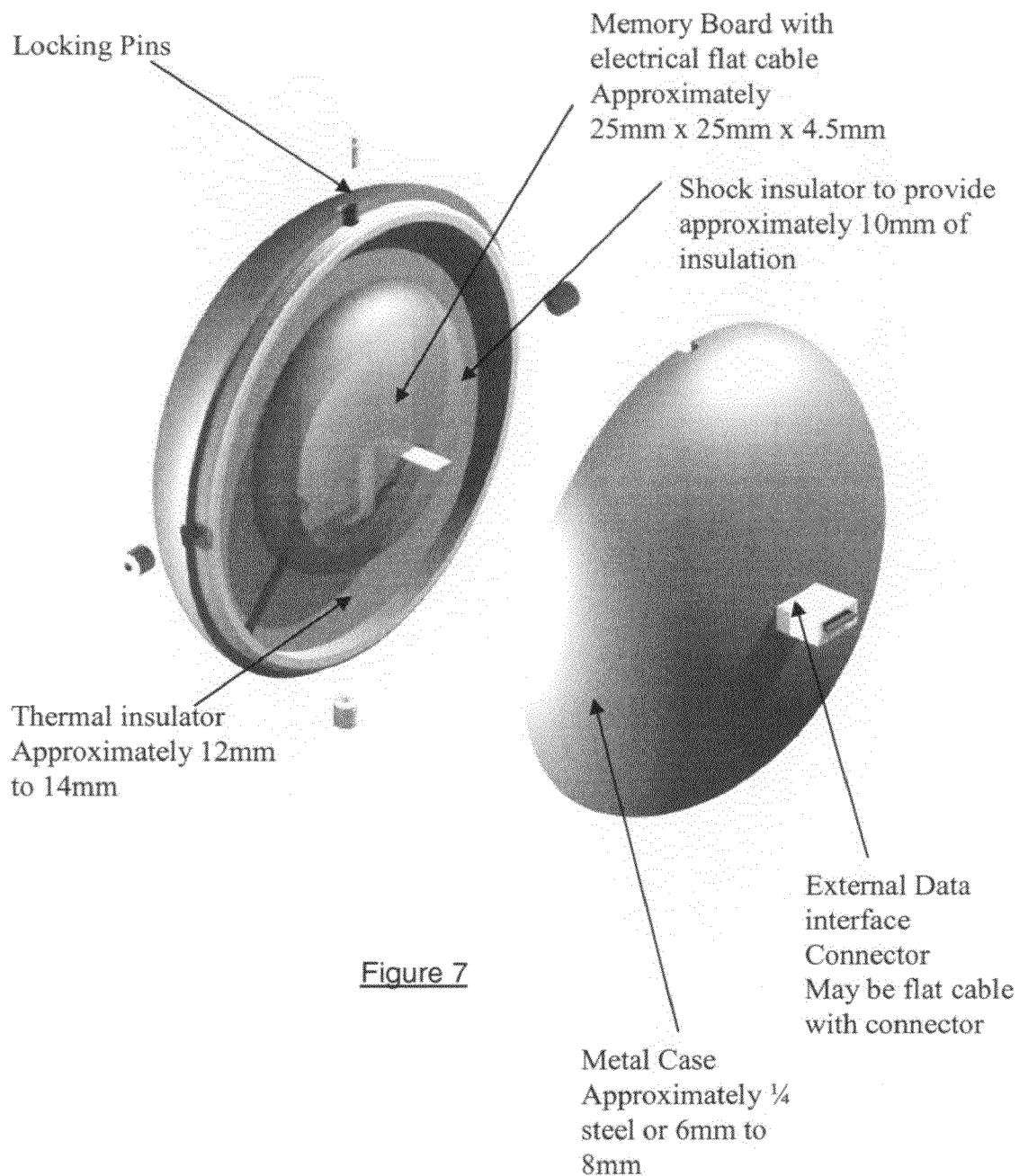
FIG. 7 shows an interior view of multiple layers of the enclosure of FIG. 5.
Figure 8:
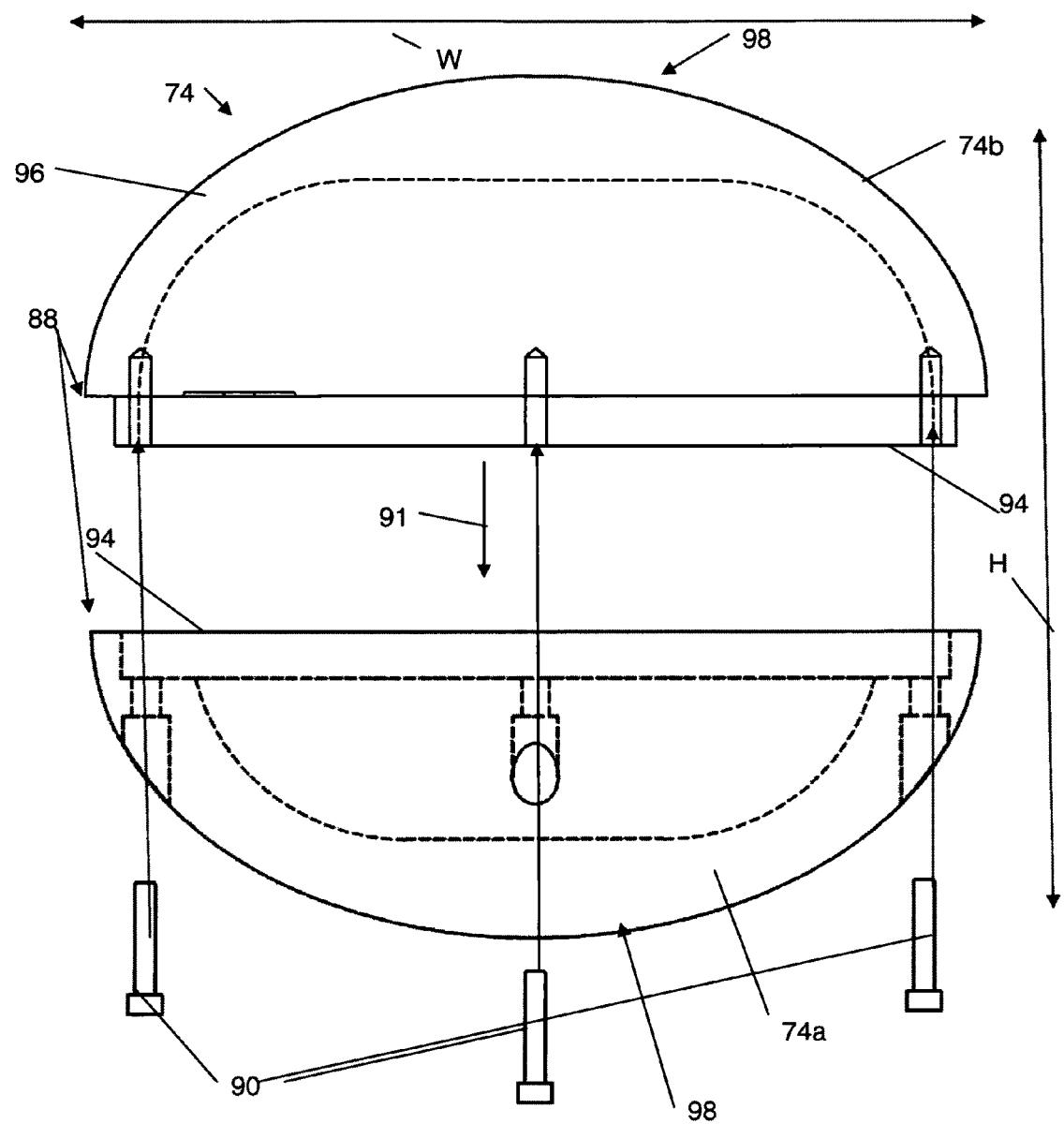
FIG. 8 shows an alternative embodiment of the external shell of the enclosure of FIG. 5.
Figure 9:
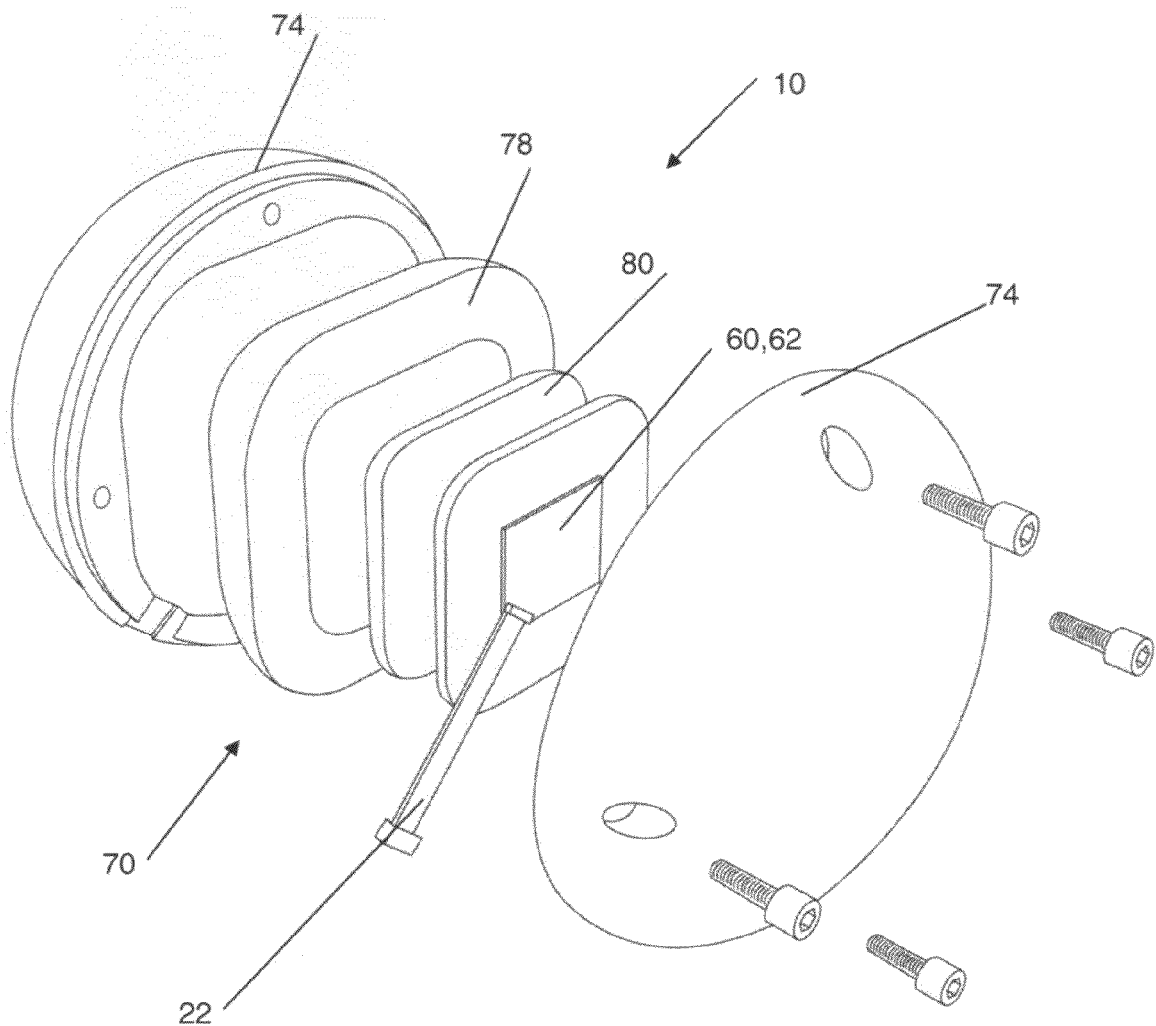
FIG. 9 shows an alternative embodiment of the device of FIG. 1.

Referring to FIG. 7, shown is the plurality of layers 74,78, 80 of the enclosure 70. Referring to FIG. 8, shown is an alternative embodiment to the shell 74. The shell 74 has two sections 74*a,b* that are connected by a plurality of fasteners (e.g. screws) 90 distributed around a periphery of the shell 74. The section 74*b* has a male portion 92 that is inserted 91 into a correspondingly sized female portion 94 of the section 74*a*, in order to assemble the shell 74. The fasteners 90 retain the male portion 92 in the correspondingly sized female portion 94, once inserted, thus completing the assembly of the shell 74. It is noted that the wall 96 of the shell is not of uniform thickness at the proximal and distal ends 98 opposite the seam 88 of the shell 74. Further, it is recognised that the shell 74 can have a width dimension W greater than its height dimension H, when the two portions 74*a,b* are assembled. It is also recognised that the shell 74 can have the two wall portions 99 of thickness greater than the wall 96 thickness adjacent to the seam 88 along the width dimension W.

Figure 10:
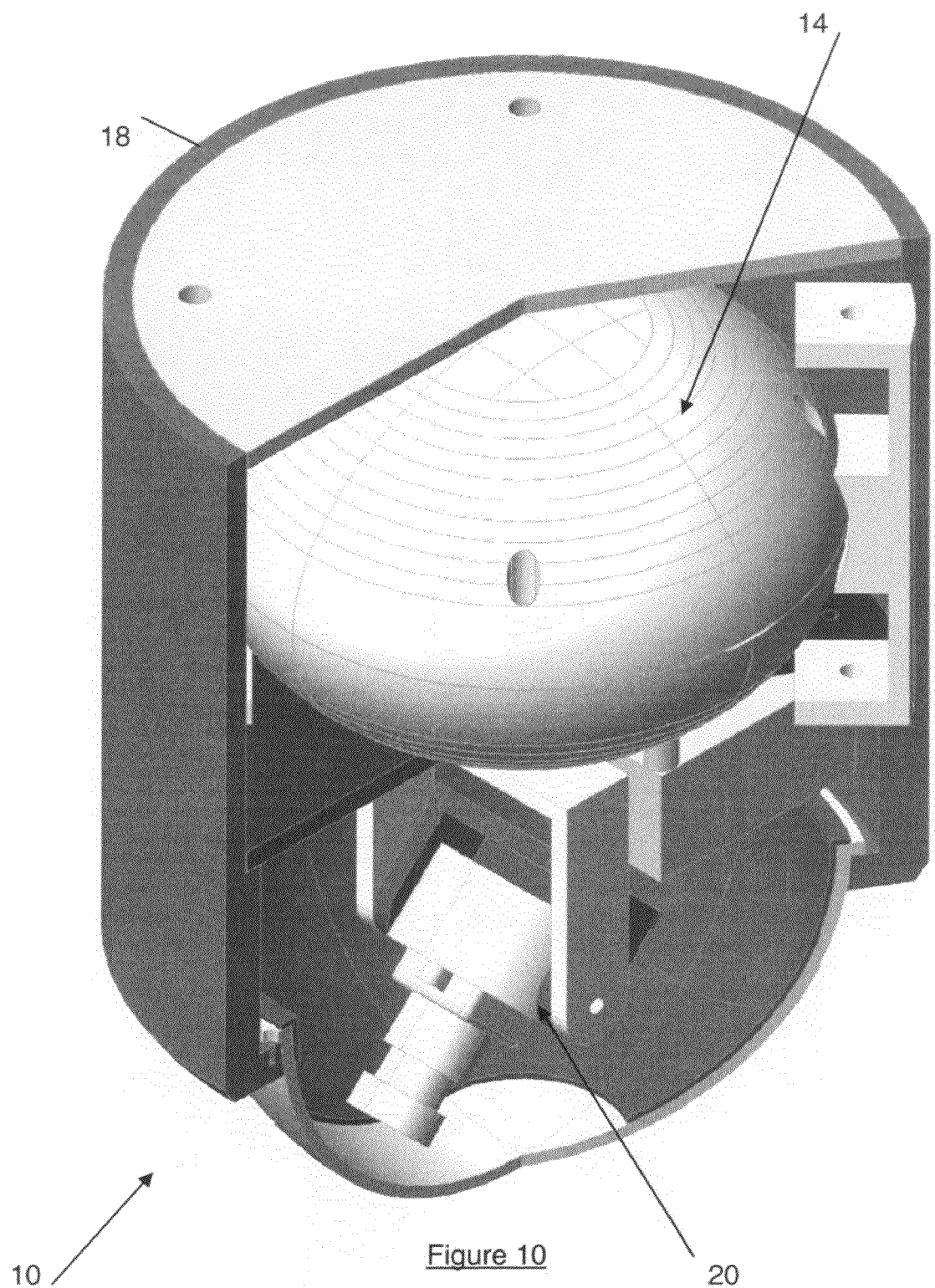
FIG. 10 shows a still further alternative embodiment of the device of FIG. 1.

FIG. 10 shows a further alternative embodiment of the device 9. FIG. 10 shows a still further alternative embodiment of the device 10.

Connection 44

The cable interface 44 between the memory component 14 and the video component 20 is wired as to reduce transfer of shock and thermal transfer. For example, a standard computer interface such as Universal Serial Bus interface (USB), SD or MMIC can be used as the interface connection 44 to transfer data between the camera module 20 and the storage module 14. Other interfaces may be also used. The interface connection 44 can have a reduced number of electrical connections in order to inhibit thermal transfer from outside the enclosure 70 into its interior. The interface connection 44 can also be used to supply power to the memory module. Additionally, the connector 44 can be designed to break off or burn away from the main camera electronics of the video component 20 in a high stress event.

Computing Device 10

Figure 11:
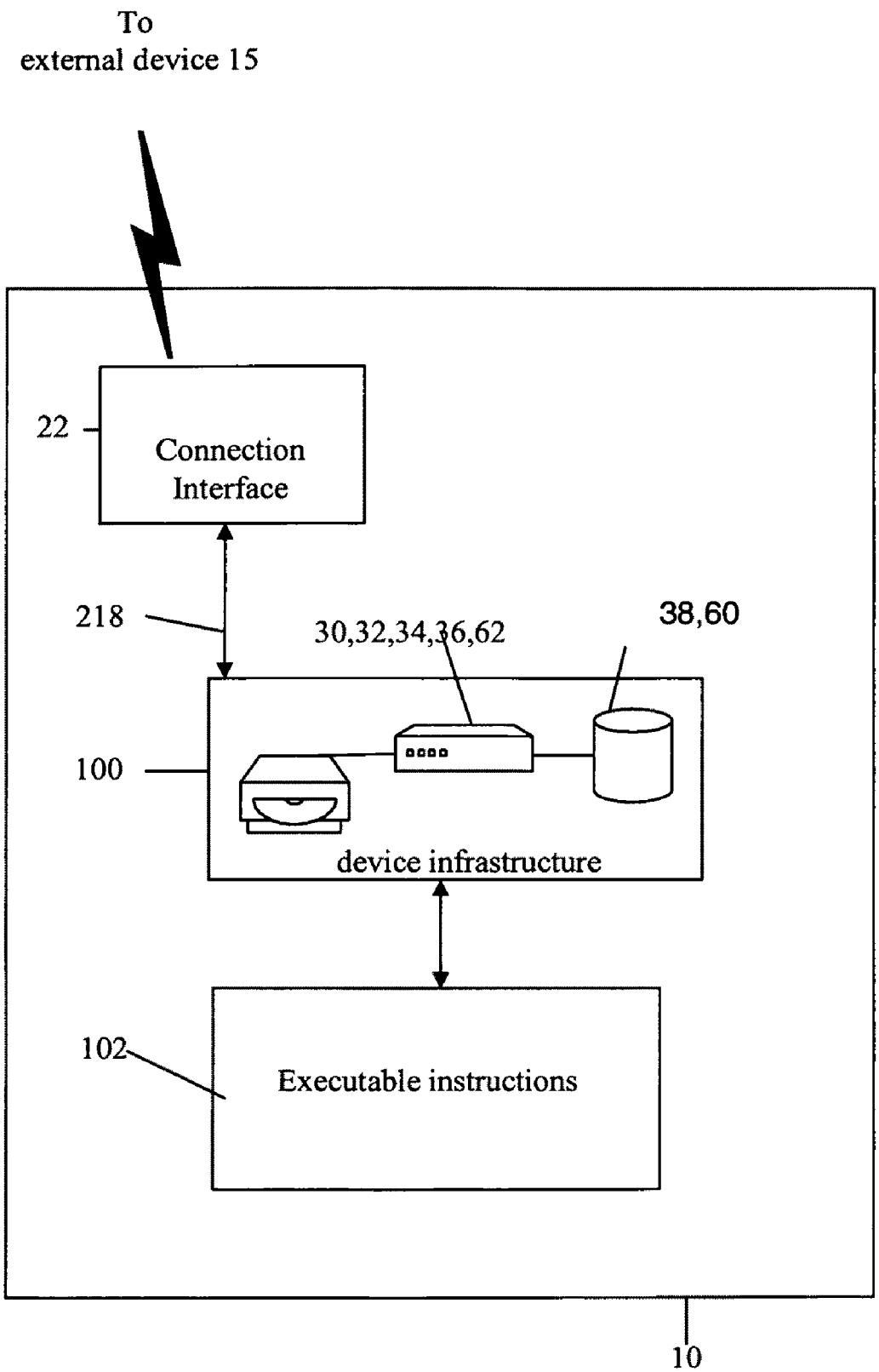
FIG. 11 is a conceptual view of the computing capabilities of the device of FIG. 2.

Referring to FIGS. 2 and 11, each of the above-described video 20 and memory 14 components contribute to the computing capabilities of the device 10. The devices 10 in general can include a network connection interface component 22, such as a network interface card or a modem, coupled to the device infrastructure 100 (e.g. controller 62 and controllers 30,32 via the connection 44). The connection interface component 22 is connectable during operation of the devices 10 to the data and/or power communication capabilities available from the external devices 15 (e.g. vehicles, other computing devices used to program/configure the device 10, etc.)

Referring again to FIG. 11, the devices 10 can interact with a user via the interface 22. For example, the interface component 22 can be used to change the configuration data 17 via the connection 46 remotely from the device 10 (e.g. wirelessly and/or wired through the connection 46). The user interface 22 can be configured to interact with an external computing device 15 with one or more user input devices such as but not limited to a QWERTY keyboard, a keypad, a track-wheel, a stylus, a mouse, a microphone and a user output device such as an LCD screen display and/or a speaker, in order to provide configuration data 17 as well as any upgrades/new software 102, as desired.

Referring again to FIG. 11, operation of the devices 10 is facilitated by the device infrastructure 100. The device infrastructure 100 includes one or more computer processors 30,32,34,36,62 and includes the associated memory 38 (e.g. a random access memory), and memory 60 (a non-volatile memory). The computer processors 30,32,34,36,62 facilitates performance of the device 10 configured for the intended task of storing video digital data 12 through operation of the lens 24 configured for capturing video data, configuration of the device 10 via configuration data 17 received via the user interface 22 and other application programs/hardware 102 of the device 10 by executing task related instructions. These task related instructions can be provided by an operating system, and/or software applications 102 located in the memory 38, 60, and/or by operability that is configured into the electronic/digital circuitry of the processor(s) 30,32,34, 36,62 designed to perform the specific task(s). Further, it is recognized that the device infrastructure 100 can include a computer readable storage medium 38,60 coupled to the processor(s) 30,32,34,36,62 for providing instructions to the processor(s) 30,32,34,36,62 and/or to load/update client applications 102 (e.g. software/firmware as discussed above). The computer readable medium 38 can include hardware and/or software such as, by way of example only, magnetic disks, magnetic tape, optically readable medium such as CD/DVD ROMS, and memory cards. In each case, the computer readable medium 38 may take the form of a small disk, hard disk drive, solid-state memory card, or RAM provided.

Further, it is recognized that the computing devices 10 can include the executable applications 102 comprising code or machine readable instructions for implementing predetermined functions/operations including those of an operating system, a DSP, and a data controller, for example. The processor(s) 30,32,34,36,62 as used herein is/are a configured device and/or set of machine-readable instructions for performing operations as described by example above. As used herein, the processor(s) 30,32,34,36,62 may comprise any one or combination of, hardware, firmware, and/or software. The processor(s) 30,32,34,36,62 act(s) upon information/data by manipulating, analyzing, modifying, converting or transmitting information/data for use by an executable procedure or an information device, and/or by routing the information with respect to an output device. The processor(s) 30,32,34,36,62 may use or comprise the capabilities of a controller or microprocessor, for example. Accordingly, any of the functionality of any of the modules/processors/components (and subsets thereof) may be implemented in hardware, software or a combination of both, as well these modules/processors/components can have their functionality combined or further subdivided other than as shown and described above. Accordingly, the use of a processor 30,32,34,36,62 as a device and/or as a set of machine-readable instructions is hereafter referred to generically as a processor/module for sake of simplicity.

We claim:

1. A video recording device having a memory, the memory adapted to be resistive to thermal and mechanical shocks experienced in a catastrophic event, the device including a plurality of interchangeable components, the device comprising:

a housing;

a video component releasably mounted in the housing and having a lens for capturing images from an external environment of the device and a digital processor for producing digital data from the captured images;

a memory component releasably mounted in the housing and releasably coupled to the video component adapted for storing the digital data received from the video component, the memory component including a non-volatile memory unit and an enclosure adapted for inhibiting the transfer of thermal and mechanical shocks from the external environment to the non-volatile memory unit, the non-volatile memory unit enclosed in the enclosure, the enclosure having a mechanical shock absorbing layer comprising a shock absorbing foam encapsulating and adjacent the non-volatile memory unit in order to mitigate the mechanical shock experienced by the non-volatile memory unit in the catastrophic event; and an interface component releasably mounted in the housing and releasably coupled to the video component and the memory component, the interface component adapted for providing power and data communication from the external environment to the video component and the memory component.

2. The device of claim 1 wherein the enclosure has a geometrical shape selected from a group consisting of: spherical and spheroidal.

3. The device of claim 2, wherein the enclosure is composed of a plurality of layers.

4. The device of claim 3, wherein the enclosure has a first layer selected for thermal absorption properties.

5. The device of claim 4, wherein the first layer is a hollow shell composed of two or more sections and the mechanical shock absorbing layer is an integral layer encapsulating the non-volatile memory unit.

6. The device of claim 3 further comprising the enclosure having an exterior shell adapted to resist impact forces of debris from the external environment caused by the catastrophic event, the exterior shell enclosing the first and second layers.

7. The device of claim 4, wherein when assembled, walls of an exterior shell adjacent to the first layer material of the first layer in compression.

8. The device of claim 4, wherein the first layer is a hollow shell composed of two or more sections and the mechanical shock absorbing layer is a shell composed of two or more sections that when joined together define an interior for containing the non-volatile memory unit.

9. The device of claim 8, wherein seams joining the sections of the first layer are spaced apart from seams joining sections of an exterior shell.

10. The device of claim 1 further comprising a memory controller coupled to the non-volatile memory unit, the memory controller for coordinating communication of the digital data between the video component and the memory component.

11. The device of claim 10, wherein the memory controller is within the enclosure and encapsulated by the mechanical shock absorbing layer.

12. The device of claim 11, wherein the memory controller inhibits a specified manipulation of the digital data stored in the non-volatile memory unit.

13. The device of claim 12, wherein the specified manipulation is selected from a group consisting of: writing the digital data and reading the digital data.

14. The device of claim 12, wherein the memory controller inhibits the specified manipulation based on whether the memory component is coupled to the video component.

15. The device of claim 14, wherein at least one of the memory component and the video component has a unique identifier.

16. The device of claim 12, wherein the memory controller inhibits the specified manipulation based on whether the memory component is coupled to the video component identified by an expected unique identifier of the video component.

17. The device of claim 4, wherein material of the mechanical shock absorbing layer is placed in compression by adjacent walls of the first layer when assembled.

18. The device of claim 1, wherein the mechanical shock absorbing layer comprises of two or more shock absorbing materials having different shock absorption properties.

19. The device of claim 8, wherein seams joining the sections of the first layer are spaced apart from seams of joining the sections of the mechanical shock absorbing layer.

20. The device of claim 1, wherein the memory component is releasably coupled to the video component by a connector having a reduced number of electrical connections to inhibit thermal transfer from the external environment.

21. The device of claim 20, wherein the connector is configured to break off or burn away in the catastrophic event.

22. The device of claim 1 wherein the enclosure has a geometrical shape that is approximately spheroidal.

23. The device of claim 9 wherein the joining sections of the exterior shell are two halves.

24. The device of claim 1 wherein the catastrophic event is a bomb blast.

* * * * *